(12) United States Patent
Ishida

(10) Patent No.: US 12,358,324 B2
(45) Date of Patent: Jul. 15, 2025

(54) PNEUMATIC TIRE

(71) Applicant: THE YOKOHAMA RUBBER CO., LTD., Kanagawa (JP)

(72) Inventor: Takuma Ishida, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 18/552,168

(22) PCT Filed: Mar. 18, 2022

(86) PCT No.: PCT/JP2022/012632
§ 371 (c)(1),
(2) Date: Sep. 22, 2023

(87) PCT Pub. No.: WO2022/202668
PCT Pub. Date: Sep. 29, 2022

(65) Prior Publication Data
US 2024/0198728 A1    Jun. 20, 2024

(30) Foreign Application Priority Data
Mar. 24, 2021 (JP) .................................. 2021-049605

(51) Int. Cl.
*B60C 1/00* (2006.01)
*B60C 11/00* (2006.01)
(Continued)

(52) U.S. Cl.
CPC .......... *B60C 1/0016* (2013.01); *B60C 11/005* (2013.01); *C08K 3/04* (2013.01);
(Continued)

(58) Field of Classification Search
CPC ........... B60C 11/005; C08K 3/04; C08K 3/36; C08L 7/00
See application file for complete search history.

(56) References Cited

U.S. PATENT DOCUMENTS 9,969,221 B2 * 5/2018 Miyazaki .................. C08L 7/00
2006/0048874 A1 * 3/2006 Maruoka ................. B60C 11/18
152/209.5
(Continued)

FOREIGN PATENT DOCUMENTS

JP         S61229602 A       10/1986
JP         H01293205 A       11/1989
(Continued)

OTHER PUBLICATIONS

International Search Report issued Jan. 7, 2022 in corresponding International Application No. PCT/JP2022/012632, filed Mar. 18, 2022.

*Primary Examiner* — Justin R Fischer
*Assistant Examiner* — Wendy L Boss
(74) *Attorney, Agent, or Firm* — Global IP Counselors, LLP

(57) ABSTRACT

A pneumatic tire includes undertread layer made of a rubber composition obtained by blending, per 100 parts by mass of diene rubber, 15 parts by mass to 45 parts by mass of carbon black having a nitrogen adsorption specific surface area $N_2SA$ of 20 $m^2/g$ to 85 $m^2/g$ and a DBP absorption of 90 mL/100 g to 200 mL/100 g, 3 parts by mass to 30 parts by mass of silica, and a silane coupling agent in an amount of 5 mass % to 15 mass % of the silica. A ratio is calculated based on a hardness Hu of an undertread rubber and an elastic modulus Ec and a hardness Hc of a cap tread rubber, is set to 110 to 140. A proportion iof a thickness G2 of the undertread layer to an under-groove rubber gauge G1, is set to 0.55 or more and 0.80 or less.

3 Claims, 2 Drawing Sheets

(51) Int. Cl.
*C08K 3/04* (2006.01)
*C08K 3/36* (2006.01)
*C08L 7/00* (2006.01)

(52) U.S. Cl.
CPC .................. *C08K 3/36* (2013.01); *C08L 7/00* (2013.01); *B60C 2011/0016* (2013.01); *C08K 2201/006* (2013.01)

(56) References Cited

U.S. PATENT DOCUMENTS

2015/0144240 A1* 5/2015 Takeuchi .................. C08L 9/00
                                                                           152/209.5
2016/0053094 A1     2/2016 Takeuchi et al.

FOREIGN PATENT DOCUMENTS

| | | |
|---|---|---|
| JP | H06157829 A | 6/1994 |
| JP | H0796715 A | 4/1995 |
| JP | 11048263 A | 2/1999 |
| JP | 2013177113 A | 9/2013 |
| JP | 5768901 B2 | 8/2015 |
| WO | 2013180257 A1 | 12/2013 |
| WO | 2014157722 A1 | 10/2014 |

* cited by examiner

PNEUMATIC TIRE

This application is a U.S. National State application of International Application No. PCT/JP2022/012632, filed Mar. 18, 2022, which claims priority to Japanese Patent Application No. 2021-049605, filed Mar. 24, 2021, the contents of each of which are hereby incorporated by reference.

TECHNICAL FIELD

The present disclosure relates to a pneumatic tire having a tread portion that includes a cap tread layer and an undertread layer.

BACKGROUND INFORMATION

Pneumatic tires used for vehicles such as trucks and buses (tires for trucks and buses) need to have excellent durability and steering stability as basic performance. On the other hand, with the recent increase in concern about environmental issues, there is a strong demand for improved fuel efficiency performance in the tires for trucks and buses.

SUMMARY

In order to provide these performances in a compatible manner, it has been determined that a tread portion of a pneumatic tire has a multilayer structure including a cap tread layer and an undertread layer, so that the basic performance is secured by the cap tread layer that contacts a road surface while reducing heat build-up by the undertread layer disposed on an inner circumferential side of the cap tread layer. For example, in JP 5768901 B, the fuel efficiency of the entire tire is improved by using a low heat build-up rubber as the rubber constituting the undertread layer. However, since the hardness and elastic modulus of the low heat build-up rubber tends to be low, simply using the low heat build-up rubber in the undertread layer could affect durability and steering stability. Thus, it has been determined that there is a need for measures to improve fuel efficiency performance (low rolling resistance) in tires for trucks and buses without impairing durability and steering stability, and to provide these performances in a highly compatible manner.

An object of the present disclosure is to provide a pneumatic tire that can improve low rolling resistance while exhibiting excellent durability and steering stability, and can provide these performances in a highly compatible manner.

A pneumatic tire according to an embodiment of the present disclosure that achieves the above-described object includes: a tread portion extending in a tire circumferential direction and having an annular shape; a pair of sidewall portions respectively disposed on both sides of the tread portion; and a pair of bead portions each disposed on an inner side of the pair of the sidewall portions in a tire radial direction. In the pneumatic tire, the tread portion is composed of two layers of a cap tread layer constituting a road contact surface of the tread portion and an undertread layer disposed on an inner side of the cap tread layer in the tire radial direction. The undertread layer is made of a rubber composition obtained by blending, per 100 parts by mass of diene rubber, 15 parts by mass to 45 parts by mass of carbon black having a nitrogen adsorption specific surface area $N_2SA$ of 20 m$^2$/g to 85 m$^2$/g and a DBP absorption of 90 mL/100 g to 200 mL/100 g, 3 parts by mass to 30 parts by mass of silica, and a silane coupling agent in an amount of 5 mass % to 15 mass % of the silica. A ratio α calculated by the following formula (1) based on a hardness Hu of the rubber composition constituting the undertread layer and an elastic modulus Ec and a hardness Hc of a rubber composition constituting the cap tread layer is 110 to 140. A proportion G2/G1, which is a proportion of a thickness G2 of the undertread layer to a total thickness G1 of the cap tread layer and the undertread layer under a groove formed in an outer surface of the tread portion, is 0.55 or more and 0.80 or less.

$$\alpha = Hu/(Ec \times Hc) \times 1000 \qquad (1)$$

In the pneumatic tire according to an embodiment of the present disclosure, the tread portion includes two layers of the cap tread layer and the undertread layer, the undertread layer is made of the rubber composition having the above-described blending proportion, and the ratio α calculated by the above-described formula (1) and the above-described proportion G2/G1 are set within appropriate ranges. Accordingly, embodiments of the disclosure can have the advantageous effect of improving low rolling resistance while exhibiting excellent durability and steering stability, and to provide these performances in a highly compatible manner. In particular, the above-described blending proportion, the rubber constituting the undertread layer can have a low heat build-up property and the rolling resistance can be effectively reduced. With the above-described ratio α being sufficiently large, steering stability can be effectively improved. With the above-described proportion being within an appropriate range, heat build-up can be reduced while durability is improved. Through a combination of the above, it is possible to provide excellent durability, steering stability, and low rolling resistance performance in a well-balanced manner.

Note that, in an embodiment of the present disclosure, the nitrogen adsorption specific surface area $N_2SA$ of carbon black is measured in accordance with JIS 6217-2. The DBP adsorption of carbon black is measured in accordance with JIS K6217-4. The elastic modulus Ec is the dynamic storage modulus (unit: MPa) of the rubber composition constituting the cap tread layer and is measured in accordance with JIS-K6394 by using a viscoelastic spectrometer under conditions of a frequency of 20 Hz, an initial strain of 10%, a dynamic distortion of ±2%, and a temperature of 20° C. The hardnesses Hu and Hc indicate the JIS-A hardnesses of the rubber compositions constituting the respective rubber layers (the undertread layer and the cap tread layer), and indicate the hardnesses of the rubbers measured at a temperature of 20° C. with a type A durometer in accordance with JIS K6253.

In an embodiment of the present disclosure, the diene rubber is preferably composed of 80 mass % to 100 mass % of a natural rubber and 20 mass % to 0 mass % of a butadiene rubber. In particular, the diene rubber is preferably composed of only natural rubber (that is, 100 mass % of natural rubber and 0 mass % of butadiene rubber).

DETAILED DESCRIPTION

Configurations of embodiments of the present disclosure will be described in detail below with reference to the accompanying drawings.

Figure 1:
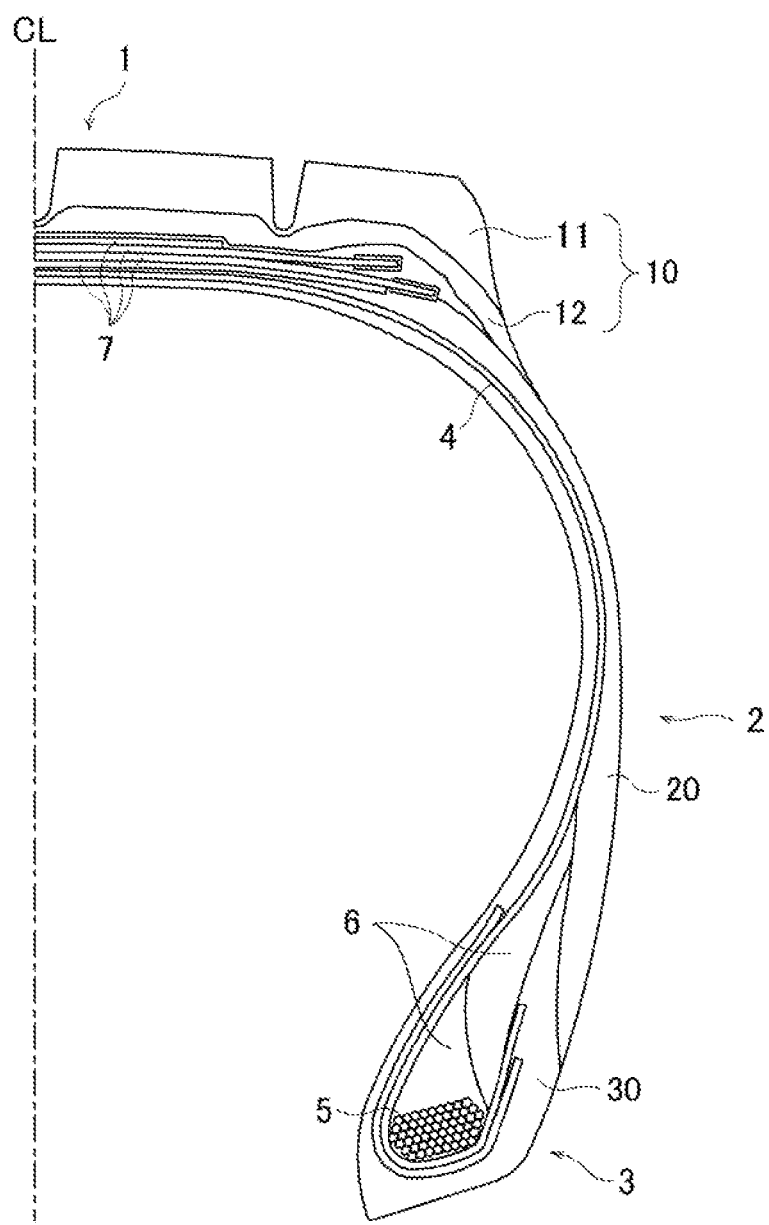
FIG. 1 is a meridian half cross-sectional view illustrating an example of a pneumatic tire according to an embodiment of the present disclosure.

As illustrated in FIG. 1, a pneumatic tire according to an embodiment of the present disclosure includes a tread portion 1, a pair of sidewall portions 2 respectively disposed on both sides of the tread portion 1, and a pair of bead portions 3 respectively disposed on an inner side in a tire radial direction of the sidewall portions 2. Note that "CL" in FIG. 1 denotes a tire equator. Although not illustrated in FIG. 1 that is a meridian cross-sectional view, the tread portion 1, the sidewall portions 2, and the bead portions 3 each extend in the tire circumferential direction and have an annular shape, forming a basic structure of a toroidal shape of the pneumatic tire. Although the description using FIG. 1 is basically based on the illustrated meridian cross-sectional shape, all of the tire components extend in the tire circumferential direction and form the annular shape.

A carcass layer 4 is mounted between the left-right pair of bead portions 3. The carcass layer 4 includes a plurality of reinforcing cords extending in the tire radial direction and is folded back around a bead core 5 disposed in each of the bead portions 3 from a vehicle inner side to a vehicle outer side. Additionally, a bead filler 6 is disposed on the outer periphery of the bead core 5, and the bead filler 6 is enveloped by a body portion and a folded back portion of the carcass layer 4.

A plurality of belt layers 7 (four layers in FIG. 1) are embedded on an outer circumferential side of the carcass layer 4 in the tread portion 1. Each belt layer 7 includes a plurality of reinforcing cords (steel cords) oriented in a predetermined direction. A cross belt pair is always included in the plurality of belt layers 7. The cross belt pair is a combination of at least two belt layers configured such that the inclination angle of the reinforcing cords with respect to the tire circumferential direction is set in the range of 10° to 40°, and the inclination directions of the reinforcing cords are reversed between the layers so that the reinforcing cords intersect with each other. In addition to the cross belt pair, a large-angle belt layer in which the inclination angle of the reinforcing cord with respect to the tire circumferential direction is set in the range of 40° to 70°, a protective belt layer disposed in the outermost layer and having a width of 85% or less of that of the other belt layers, and a circumferential reinforcing layer in which the angle of the reinforcing cord with respect to the tire circumferential direction is set in the range of 0° to 5° can be optionally provided. For example, in FIG. 1, one protective belt layer is disposed on the outermost layer, one large-angle belt layer is disposed on the innermost layer, and the other two layers are the cross belt pair. In addition, a belt reinforcing layer (not illustrated) can be provided on the outer circumferential side of the belt layers 7. The belt reinforcing layer can be configured of, for example, an organic fiber cord oriented in the tire circumferential direction. The angle of the organic fiber cords constituting a belt reinforcing layer 8 with respect to the tire circumferential direction can be set to, for example, from 0° to 5°.

In the following description, these belt layers 7 and the belt reinforcing layer 8 can be collectively referred to as a reinforcing layer. In an embodiment of the present disclosure, as the reinforcing layer, only the belt layers 7 can be provided, or both of the belt layers 7 and the belt reinforcing layer 8 can be provided. In the following description, "outer circumferential side of the reinforcing layer" means an outer circumferential side of a belt layer 7 (an outermost layer of the plurality of belt layers 7 in the tire radial direction) in a case where only the belt layers 7 are provided, or means an outer circumferential side of a belt reinforcing layer 8 (an outermost layer of a plurality of belt reinforcing layers 8 in the tire radial direction) in a case where the belt layers 7 and the belt reinforcing layers 8 are provided.

In the tread portion 1, a tread rubber layer 10 is disposed on the outer circumferential side of the carcass layer 4 and the reinforcing layer (the belt layers 7 and the belt reinforcing layers 8) described above. In an embodiment of the present disclosure, the tread rubber layer 10 has a structure in which two types of rubber layers having different physical properties (a cap tread layer 11 and an undertread layer 12) are layered in the tire radial direction. The cap tread layer 11 is disposed on outer circumferential side of the undertread layer 12 and constitutes a road contact surface of the tread portion 1. The undertread layer 12 is sandwiched between the cap tread layer 11 and the reinforcing layer described above. A side rubber layer 20 is disposed on the outer circumferential side (the outer side in the tire width direction) of the carcass layer 4 in the sidewall portion 2, and a rim cushion rubber layer 30 is disposed on the outer circumferential side (the outer side in the tire width direction) of the carcass layer 4 in the bead portion 3.

Any number of grooves 40 can be formed in an outer surface of the tread portion 1. The grooves 40 refer to circumferential grooves extending in the tire circumferential direction and lug grooves extending in the tire width direction. Since FIG. 1 is a meridian cross-sectional view, only the circumferential grooves are illustrated as the grooves 40, and the lug grooves are not illustrated. Various types of land portions 50 can be formed in the tread portion 1 by the grooves 40. The land portions 50 includes, for example, a rib-like land portion 50 extending along the tire circumferential direction, and a block-shaped land portion 50 whose circumference is defined by the grooves 40. As illustrated in FIG. 1, in an entire region including a region under the grooves 40 and a region under the land portions 50, the tread rubber layer 10 has a structure in which the cap tread layer 11 and the undertread layer 12 are layered in the tire radial direction.

An embodiment of the present disclosure relates to the tread portion 1, and thus other portions and constituent members are not limited to the structure described above. Note that, in the following description, a rubber composition constituting the cap tread layer 11 can be referred to as a cap tread rubber, and a rubber composition constituting the undertread layer 12 can be referred to as an undertread rubber.

In the rubber composition constituting the undertread layer 12, the rubber component is a diene rubber. As the diene rubber, a natural rubber is necessarily used, and a butadiene rubber can be optionally used in combination.

As the natural rubber used in the undertread rubber, a rubber that is generally used in rubber compositions for tires can be used. Durability can be further enhanced by blending the natural rubber. The content of the natural rubber is preferably 80 mass % to 100 mass %, more preferably 100 mass %, in 100 mass % of the diene rubber. When the content of the natural rubber is less than 80 mass %, durability cannot be sufficiently improved.

As the butadiene rubber used in the undertread rubber, a rubber that is generally used in rubber compositions for tires, such as unmodified butadiene rubber and modified butadiene rubber, can be used. Low rolling resistance can be further enhanced by blending the butadiene rubber. However, in consideration of use as the undertread rubber, the blended amount of the butadiene rubber is preferably small. The content of the butadiene rubber is preferably 20 mass % to 0 mass %, more preferably 0 mass %, in 100 mass % of the diene rubber. When the content of the butadiene rubber is greater than 20 mass %, low rolling resistance cannot be sufficiently improved. In addition, since the content of the natural rubber decreases with an increase in the content of the butadiene rubber, it is difficult to secure durability.

Silica and carbon black are necessarily blended in the undertread rubber. By blending carbon black and silica, heat build-up of the rubber composition can be made small, and tire durability can be improved by improving mechanical properties such as rubber hardness, tensile strength at break, and tensile elongation at break. Particularly, in the undertread rubber, by using relatively high-structured carbon black having a large particle size to be described later, it is possible to maintain good mechanical properties such as rubber hardness, tensile strength at break, and tensile elongation at break while reducing tan δ (60° C.) of the rubber composition. As the silica, a silica that is typically used in rubber compositions for tires can be blended, and, for example, wet silica, dry silica, and surface-treated silica can be used.

The carbon black used in the undertread rubber has a nitrogen adsorption specific surface area $N_2SA$ of from 20 $m^2/g$ to 85 $m^2/g$, preferably from 30 $m^2/g$ to 85 $m^2/g$, and more preferably from 30 $m^2/g$ to 75 $m^2/g$. When the $N_2SA$ is less than 20 $m^2/g$, mechanical properties such as rubber hardness, tensile strength at break, and wear resistance of the rubber composition are deteriorated. When the $N_2SA$ exceeds 85 $m^2/g$, tan δ (60° C.) is increased and heat build-up is deteriorated.

The DBP absorption of the carbon black used in the undertread rubber is from 90 mL/100 g to 200 mL/100 g, preferably from 105 mL/100 g to 200 mL/100 g, and more preferably from 105 mL/100 g to 160 mL/100 g. When the DBP absorption is less than 90 mL/100 g, the reinforcing performance of the carbon black cannot be sufficiently obtained, and tire durability is decreased. When the DBP absorption exceeds 200 mL/100 g, forming processability of the rubber composition is decreased, and mechanical properties such as tensile strength at break and tensile elongation at break are decreased, leading to deterioration of tire durability. Further, the viscosity of the rubber composition is increased and processability is deteriorated.

The blended amount of the carbon black is from 15 parts by mass to 45 parts by mass, preferably from 20 parts by mass to 40 parts by mass, and more preferably from 30 parts by mass to 40 parts by mass, per 100 parts by mass of the diene rubber described above. When the blended amount of the carbon black is less than 15 parts by mass, reinforcing performance for the rubber composition cannot be sufficiently obtained, and rubber hardness and tensile strength at break become insufficient. When the blended amount of the carbon black exceeds 45 parts by mass, heat build-up of the rubber composition is increased and tensile elongation at break is decreased.

The blended amount of the silica is from 3 parts by mass to 30 parts by mass, preferably from 5 parts by mass to 25 parts by mass, and more preferably from 7 parts by mass to 23 parts by mass, per 100 parts by mass of the above-described diene rubber. By setting the blended amount of the silica within such a range, low rolling resistance and durability can be achieved in a compatible manner when a tire is produced. When the blended amount of the silica is less than 3 parts by mass, heat build-up is increased and rolling resistance cannot be sufficiently decreased when a tire is produced. Further, tensile strength at break of the rubber composition is decreased. When the blended amount of the silica exceeds 30 parts by mass, tensile strength at break is decreased and durability is decreased when a tire is produced.

The sum of the blended amounts of the silica and the carbon black is preferably from 20 parts by mass to 75 parts by mass, and more preferably from 25 parts by mass to 70 parts by mass, per 100 parts by mass of the above-described diene rubber. By setting the total amount of the silica and the carbon black within such a range, the low rolling resistance and the durability of the rubber composition can be balanced at higher levels. When the total amount of the silica and the carbon black is less than 20 parts by mass, tire durability cannot be ensured. When the total amount of the silica and the carbon black exceeds 75 parts by mass, heat build-up is increased and rolling resistance is deteriorated.

In the undertread rubber, a silane coupling agent is necessarily blended together with the silica. Accordingly, the dispersibility of the silica is improved, and the reinforcing property for the rubber component can be further enhanced. The blended amount of the silane coupling agent is from 5 mass % to 15 mass %, and preferably from 7 mass % to 13 mass %, relative to the amount of the silica. When the blended amount of the silane coupling agent is less than 5 mass % of the silica weight, the effect of improving the dispersibility of the silica cannot be sufficiently obtained. Furthermore, when the blended amount of the silane coupling agent exceeds 15 mass %, the silane coupling agent itself condenses, and the desired effects cannot be obtained.

The silane coupling agent is not particularly limited, but a sulfur-containing silane coupling agent is preferably used. Examples of the sulfur-containing silane coupling agent include bis-(3-triethoxysilylpropyl)tetrasulfide, bis-(3-triethoxysilylpropyl)disulfide, 3-trimethoxysilylpropyl benzothiazole tetrasulfide, γ-mercaptopropyl triethoxysilane, and 3-octanoylthiopropyl triethoxysilane.

In the pneumatic tire according to an embodiment of the present disclosure, the blending proportion of the rubber composition constituting the cap tread layer 11 is not particularly limited, a rubber composition typically used for a cap tread of pneumatic tires can be employed.

In an embodiment of the present disclosure, the rubber composition constituting the cap tread layer 11 and the rubber composition constituting the undertread layer 12 can contain various additives, such as a vulcanization or cross-linking agent, a vulcanization accelerator, various oils, an anti-aging agent, and a plasticizer, that are typically used for rubber compositions for tires besides the compounding agents described above in a range that does not impair the object of the present disclosure. These additives can be kneaded by a typical method to form a rubber composition to be used for vulcanization or crosslinking. The blended amounts of these additives can be known typical blended amounts without departing from the object of the present disclosure. The rubber composition for a tire can be produced by mixing each component described above by using a common rubber kneading machine such as a Banbury mixer, a kneader, and a roll.

In the tread portion 1 of the pneumatic tire according to an embodiment of the present disclosure, the cap tread layer 11 and the undertread layer 12 are layered, that is, the undertread rubber and the cap tread rubber are used in combination. At this time, when the hardness of the rubber composition constituting the undertread layer 12 (undertread rubber) is defined as a hardness Hu and the elastic modulus of the rubber composition constituting the cap tread layer (cap tread rubber) are defined as an elastic modulus Ec and a hardness Hc, respectively, a ratio α calculated by the following formula (1) using these elastic modulus and hardnesses is set to 110 to 140, preferably 115 to 140, and more preferably 115 to 135. By setting the ratio α within an appropriate range as described above, steering stability can be effectively improved. When the ratio α does not satisfy the formula (1), it is difficult to satisfactorily exhibit steering stability.

$$\alpha = Hu/(Ec \times Hc) \times 1000 \quad (1)$$

Note that individual values of the hardness Hu of the undertread rubber and the elastic modulus Ec and the hardness Hc of the cap tread rubber are not particularly limited. However, the hardness Hu of the undertread rubber can be set to, for example, 55 to 70, the elastic modulus Ec of the cap tread rubber can be set to, for example, 5.0 MPa to 15.0 MPa, and the hardness Hc of the cap tread rubber can be set to, for example, 55 to 75. Further, when the elastic modulus of the undertread rubber is set as an elastic modulus Eu, the elastic modulus Eu can be set to, for example, 2.0 MPa to 10.0 MPa although not involved in the above-described formula (1). Similarly to the elastic modulus Ec, the elastic modulus Eu is a value measured in accordance with JIS-K6394 by using a viscoelastic spectrometer under conditions of a frequency of 20 Hz, an initial strain of 10%, a dynamic distortion of ±2%, and a temperature of 20° C.

Figure 2:
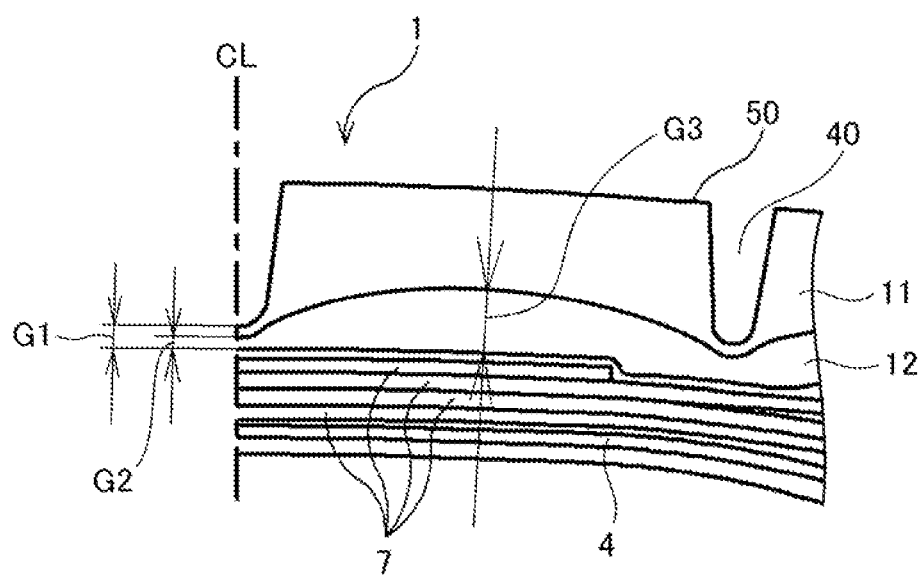
FIG. 2 is an explanatory diagram illustrating a part of the tread portion in FIG. 1 in an enlarged manner.

As described above, the grooves 40 are formed in the tread portion 1 of the pneumatic tire according to an embodiment of the present disclosure. When the sum of the thicknesses of the cap tread layer 11 and the undertread layer 12 in a region under the grooves 40 formed in an outer surface of the tread portion 1 as illustrated in FIG. 2 is defined as G1 and the thickness of the undertread layer 12 in the region under the grooves 40 formed in the outer surface of the tread portion 1 is defined as G2, a proportion G2/G1 is set to 0.55 or more and 0.80 or less, preferably 0.63 or more and 0.80 or less, more preferably 0.66 or more and 0.78 or less. By defining the relationship between the rubber thicknesses (proportion G2/G1) in this way, it is possible to reduce heat build-up while improving durability. When the proportion G2/G1 is less than 0.55, the amount of the undertread rubber becomes insufficient, and thus the effect of reducing rolling resistance by the undertread rubber that has the above-described blending proportion and thus has a low heat build-up property cannot be sufficiently expected. When the proportion G2/G1 exceeds 0.80, the undertread layer 12 becomes too thick and it becomes difficult to obtain sufficient durability.

Further, regarding the thickness of the undertread layer 12, when the thickness of the undertread layer 12 in a region under the land portion 50 formed in the outer surface of the tread portion 1 as illustrated in FIG. 2 is defined as G3, a proportion G3/G1 is preferably 0.45 or more and 0.95 or less, and more preferably 0.50 or more and 0.90 or less. By defining the relationship between the rubber thicknesses (proportion G3/G1) in this way, it is advantageous to reduce heat build-up while improving durability. When the proportion G3/G1 is less than 0.45, the amount of the undertread rubber becomes insufficient, and thus the effect of reducing rolling resistance by the undertread rubber that has the above-described blending proportion and thus has a low heat build-up property cannot be sufficiently expected. When the proportion G3/G1 exceeds 0.95, the undertread layer 12 becomes too thick, making it difficult to obtain sufficient durability.

Note that, as illustrated in FIG. 2, the above-described G1 is a distance measured from an outer surface of a reinforcing layer located on an outermost circumferential side among the reinforcing layers (the belt layers 7 or the belt reinforcing layers 8) provided in the tire to a groove bottom of the groove 40 formed in the tread portion 1 along a perpendicular line to the outer surface of the reinforcing layer described above. The above-described G2 is a distance measured from the outer surface of the reinforcing layer located on the outermost circumferential side among the reinforcing layers (the belt layers 7 or the belt reinforcing layers 8) provided in the tire to a boundary between the cap tread layer 11 and the undertread layer 12 along the perpendicular line to the outer surface of the reinforcing layer at the same location as the above-described G1. The above-described G3 is a distance (maximum value) measured from the outer surface of the reinforcing layer located on the outermost circumferential side among the reinforcing layers (the belt layers 7 or the belt reinforcing layers 8) provided in the tire to a boundary between the cap tread layer 11 and the undertread layer 12 along a perpendicular line to the outer surface of the reinforcing layer in a region under the land portion 50 formed in the tread portion 1. G1, G2, and G3 are not particularly limited as long as the above-described relationships are satisfied, and G1 can be set to, for example, 1.0 mm to 10.0 mm, G2 can be set to, for example, 1.0 mm to 10.0 mm, and G3 can be set to, for example, 1.0 mm to 10.0 mm.

In the pneumatic tire according to an embodiment of the present disclosure, the undertread layer 12 is made of the rubber composition having the above-described blending proportion, and the ratio α calculated by the above-described formula (1) and the above-described proportion G2/G1 and the like are set within appropriate ranges. Accordingly, by a combination of the above, it is possible to provide excellent durability, steering stability, and low rolling resistance in a well-balanced and a highly compatible manner.

An embodiment of the present disclosure will further be described below by way of Examples, but the scope of an embodiment of the present disclosure is not limited to these Examples.

Examples

Pneumatic tires (test tires) having the basic structure illustrated in FIG. 1 and a tire size of 275/80R22.5 151/148J were manufactured by using, for the undertread layer (undertread rubber), 16 types of rubber compositions for a tire (Standard Example 1, Comparative Examples 1 to 4, and Examples 1 to 11) each having the blending proportion indicated in Table 1. In preparation of these 16 types of rubber compositions for tires, ingredients other than a vulcanization accelerator and sulfur were weighed and kneaded in a 1.8 L sealed Banbury mixer for 5 minutes. Then, a master batch was discharged and cooled at room temperature. Thereafter, the master batch was charged into the 1.8 L sealed Banbury mixer, and the vulcanization accelerator and sulfur were added and mixed for two minutes to obtain the 16 types of rubber compositions for tires.

In each of the test tires, a cap tread rubber listed in the row of "Type of cap tread" in Table 1 was used as the cap tread rubber constituting the cap tread layer. Specifically, any one of cap tread rubbers A to C having the blending proportions listed in Table 2 was used.

Table 1 also shows the ratio α calculated by the following formula (1) based on the hardness Hu of the rubber constituting the undertread layer and the elastic modulus Ec and the hardness Hc of the rubber constituting the cap tread layer. These physical properties were measured by using a vulcanized rubber test piece made of each of the rubber compositions for tires. The test piece was produced by vulcanizing each of the rubber compositions at 145° C. for 35 minutes in a mold having a predetermined shape. Specifically, the elastic modulus Ec was measured in accordance with JIS-K6394 by using a viscoelastic spectrometer under conditions of a frequency of 20 Hz, an initial strain of 10%, a dynamic distortion of ±2%, and a temperature of 20° C. The hardnesses Hu and Hc were measured in accordance with JIS K6253 by using a type A durometer at a temperature of 20° C.

$$\alpha = Hu/(Ec \times Hc) \times 1000 \tag{1}$$

Table 1 also shows a rubber gauge G1 under a groove formed in an outer surface of the tread portion, the thickness G2 of the undertread layer under the groove formed in the outer surface of the tread portion 1, and the thickness G3 of the undertread layer under a land portion formed in the outer surface of the tread portion.

For each of the test tires, steering stability, low rolling performance, and durability were evaluated by the following methods.

Steering Stability

The test tires were mounted on wheels having a rim size of 22.5×7.50, inflated to an air pressure of 900 kPa, and mounted on a test vehicle (20-ton vehicle), and sensory evaluation on steering stability was performed by a test driver on a test course including a paved road under a half load condition (13 t). Evaluation results are expressed as index values, Standard Example 1 being assigned an index value of 100. Larger index values indicate superior steering stability.

Low Rolling Performance

The test tires were mounted on wheels having a rim size of 22.5×7.50, and rolling resistances were measured in accordance with ISO 28580 by using a drum testing machine having a drum diameter of 1707.6 mm under conditions of an air pressure of 900 kPa, a load of 33.8 kN, and a speed of 80 km/h. Evaluation results are expressed as index values with Standard Example 1 being assigned an index value of 100. Smaller index values indicate lower rolling resistance and better low rolling performance.

Durability

The test tires were mounted on wheels having a rim size of 22.5×7.50, and mounted on a drum testing machine having a drum diameter of 1707.6 mm, and a running test was started under conditions of an air pressure of 900 kPa, a slip angle of 2 degrees, an initial load of 33.8 kN, and a speed of 45 km/h. Then, the load was increased by 10% every 24 hours, and running distances until the tires failed were measured. Evaluation results are expressed as index values with Standard Example 1 being assigned an index value of 100. Larger index values indicate longer running distance until the tires failed and better durability.

TABLE 1

| | | Standard Example 1 | Example 1 | Example 2 | Comparative Example 1 | Comparative Example 2 | Comparative Example 3 | Comparative Example 4 | Example 3 | Example 4 | Example 5 | Example 6 | Example 7 | Example 8 | Example 9 | Example 10 | Example 11 |
|---|---|---|---|---|---|---|---|---|---|---|---|---|---|---|---|---|---|
| NR | Parts by mass | 100 | 100 | 95 | 65 | 100 | 100 | 100 | 100 | 100 | 100 | 100 | 100 | 100 | 100 | 100 | 100 |
| BR | Parts by mass | | | 5 | 35 | | | | | | | | | | | | |
| CB1 (ISAF) | Parts by mass | 45 | | | | | | | | | | | | | | | |
| CB2 (FEF) | Parts by mass | | 40 | | 25 | 40 | | 50 | 15 | 45 | 40 | 40 | 40 | 40 | 40 | 40 | 40 |
| CB3 (GPF) | Parts by mass | | | 40 | | | | | | | | | | | | | |
| CB4 (SAF) | Parts by mass | | | | | | 40 | | | | | | | | | | |
| Silica | Parts by mass | | 10 | 10 | 15 | 10 | 15 | 15 | 10 | 10 | 3 | 30 | 10 | 10 | 10 | 10 | 10 |
| Silane coupling agent | Parts by mass | | 1.0 | 1.0 | 1.0 | 2.0 | 1.0 | 1.0 | 1.0 | 1.0 | 0.3 | 3.0 | 0.5 | 1.5 | 1.0 | 1.0 | 1.0 |
| (Proportion relative to silica Mass%) | | | 10 | 10 | 6.7 | 20 | 6.7 | 6.7 | 10 | 10 | 10 | 10 | 5 | 15 | 10 | 10 | 10 |
| Anti-aging agent 1 | Parts by mass | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Stearic acid | Parts by mass | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Zinc oxide | Parts by mass | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |

TABLE 1-continued

| | | Standard Example 1 | Example 1 | Example 2 | Comparative Example 1 | Comparative Example 2 | Comparative Example 3 | Comparative Example 4 | Example 3 | Example 4 | Example 5 | Example 6 | Example 7 | Example 8 | Example 9 | Example 10 | Example 11 |
|---|---|---|---|---|---|---|---|---|---|---|---|---|---|---|---|---|---|
| Vulcanization accelerator | Parts by mass | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Sulfur | Parts by mass | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Type of cap tread | | A | B | B | B | B | A | B | B | B | B | B | B | B | C | B | B |
| Ratio α | % | 101 | 128 | 123 | 108 | 143 | 109 | 141 | 110 | 139 | 121 | 139 | 126 | 134 | 110 | 128 | 128 |
| G1 | mm | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 |
| G2 | mm | 3.9 | 3.3 | 3.3 | 3.9 | 4.4 | 3.3 | 4.4 | 3.3 | 3.3 | 3.3 | 3.3 | 3.3 | 3.3 | 3.3 | 2.5 | 3.6 |
| G3 | mm | 3.9 | 3.3 | 3.3 | 3.9 | 4.4 | 3.3 | 4.4 | 3.3 | 3.3 | 3.3 | 3.3 | 3.3 | 3.3 | 3.3 | 2.5 | 3.6 |
| Proportion G2/G1 | | 0.87 | 0.73 | 0.73 | 0.87 | 0.98 | 0.73 | 0.98 | 0.73 | 0.73 | 0.73 | 0.73 | 0.73 | 0.73 | 0.73 | 0.55 | 0.80 |
| Proportion G3/G1 | | 0.87 | 0.73 | 0.73 | 0.87 | 0.98 | 0.73 | 0.98 | 0.73 | 0.73 | 0.73 | 0.73 | 0.73 | 0.73 | 0.73 | 0.55 | 0.80 |
| Index Steering stability value | | 100 | 106 | 104 | 98 | 95 | 99 | 102 | 101 | 107 | 106 | 107 | 103 | 107 | 102 | 107 | 102 |
| Index Low rolling performance value | | 100 | 95 | 93 | 89 | 96 | 108 | 105 | 98 | 98 | 94 | 99 | 95 | 98 | 99 | 98 | 94 |
| Durability Rating | | 100 | 108 | 106 | 90 | 89 | 110 | 93 | 101 | 110 | 107 | 110 | 108 | 108 | 108 | 109 | 103 |

Types of raw materials used indicated in Table 1 are described below.

NR: Natural rubber, TSR20
BR: Butadiene rubber, Nipol BR1220, available from ZEON CORPORATION
CB1: Carbon black, #300IH, available from NSCC Carbon Co., Ltd. (Type: ISAF, Nitrogen adsorption specific surface area $N_2SA=120$ m$^2$/g, DBP absorption=126 mL/100 g)
CB 2: Carbon black, SEAST SO, available from Tokai Carbon Co., Ltd. (Type: FEF, nitrogen adsorption specific surface area $N_2SA=42$ m$^2$/g, DBP absorption=115 mL/100 g)
CB 3: Carbon black, Niteron #55S, available from NSCC Carbon Co., Ltd. (Type: GPF, nitrogen adsorption specific surface area $N_2SA=28$ m$^2$/g, DBP absorption=88 mL/100 g)
CB 4: Carbon black, SEAST 9, available from Tokai Carbon Co., Ltd. (Type: SAF, nitrogen adsorption specific surface area $N_2SA=142$ m$^2$/g, DBP absorption=115 mL/100 g)
Silica: Nipsil AQ, available from Tosoh Corporation
Silane coupling agent: Si69, available from EVONIC DEGUSSA
Anti-aging agent 1: NOCRAC 6C, available from Ouchi Shinko Chemical Industrial Co., Ltd.
Stearic acid: Stearic acid 50S for industrial use, available from Nissin Chemical Co., Ltd.
Zinc oxide: Zinc Oxide III, available from Seido Chemical Industry Co., Ltd.
Vulcanization accelerator: SANCELER NS-G, available from Sanshin Chemical Industry Co., Ltd.
Sulfur: Golden Flower oil treated sulfur powder, available from Tsurumi Chemical Industry Co., Ltd.

TABLE 2

| | | Cap tread rubber A | Cap tread rubber B | Cap tread rubber C |
|---|---|---|---|---|
| NR | Parts by mass | 100 | 80 | 80 |
| BR | Parts by mass | 0 | 20 | 20 |
| CB1 (SAF) | Parts by mass | 50 | 20 | 20 |
| CB2 (ISAF) | Parts by mass | 0 | 25 | 30 |
| Anti-aging agent | Parts by mass | 3.0 | 3.0 | 3.0 |
| Stearic acid | Parts by mass | 2.0 | 2.0 | 2.0 |
| Zinc oxide | Parts by mass | 3.0 | 3.0 | 3.0 |
| Vulcanization accelerator | Parts by mass | 1.0 | 1.0 | 1.0 |
| Sulfur | Parts by mass | 2.0 | 2.0 | 2.0 |

The types of raw materials used indicated in Table 2 are described below.

NR: Natural rubber, TSR20
BR: Butadiene rubber, Nipol BR1220, available from ZEON CORPORATION
CB 1: Carbon black, SEAST 9, available from Tokai Carbon Co., Ltd. (Type: SAF, nitrogen adsorption specific surface area $N_2SA=142$ m$^2$/g, DBP absorption=115 mL/100 g)
CB2: Carbon black, #300IH, available from NSCC Carbon Co., Ltd. (Type: ISAF, Nitrogen adsorption specific surface area $N_2SA=120$ m$^2$/g, DBP absorption=126 mL/100 g)
Silica: Nipsil AQ, available from Tosoh Corporation
Silane coupling agent: Si69, available from EVONIC DEGUSSA
Anti-aging agent: NOCRAC 6C, available from Ouchi Shinko Chemical Industrial Co., Ltd.

Stearic acid: Stearic acid 50S for industrial use, available from Nissin Chemical Co., Ltd.

Zinc oxide: Zinc Oxide III, available from Seido Chemical Industry Co., Ltd.

Vulcanization accelerator: SANCELER NS-G, available from Sanshin Chemical Industry Co., Ltd.

Sulfur: Golden Flower oil treated sulfur powder, available from Tsurumi Chemical Industry Co., Ltd.

As can be seen from Table 1, the pneumatic tires of Examples 1 to 11 improved low rolling performance while improving steering stability and durability as compared with those of Standard Example 1. On the other hand, in Comparative Example 1, since the ratio α calculated by the formula (1) was small because the butadiene rubber exceeded 20 parts by mass and the proportion G2/G1 was large, steering stability and durability were deteriorated. In Comparative Example 2, since the proportion G2/G1 was too large, steering stability and durability were deteriorated. In Comparative Example 3, since the type of the carbon black was SAF and the nitrogen adsorption specific surface area $N_2SA$ was 142 $m^2/g$ that was too large, steering stability and low rolling performance were deteriorated. In Comparative Example 4, since the blended amount of the carbon black was large and the proportion G2/G1 was too large, durability and low rolling performance were deteriorated.

The invention claimed is:

1. A pneumatic tire comprising:
   a tread portion extending in a tire circumferential direction and having an annular shape;
   a pair of sidewall portions respectively disposed on both sides of the tread portion; and
   a pair of bead portions each disposed on an inner side of the pair of the sidewall portions in a tire radial direction,
   the tread portion comprising two layers of a cap tread layer constituting a road contact surface of the tread portion and an undertread layer disposed on an inner side of the cap tread layer in the tire radial direction,
   the undertread layer being made of a rubber composition obtained by blending, per 100 parts by mass of diene rubber, 15 parts by mass to 45 parts by mass of carbon black having a nitrogen adsorption specific surface area $N_2SA$ of 20 $m^2/g$ to 85 $m^2/g$ and a DBP absorption of 90 mL/100 g to 200 mL/100 g, 3 parts by mass to 30 parts by mass of silica, and a silane coupling agent in an amount of 5 mass % to 15 mass % of the silica,
   a ratio α being 110 to 140, the ratio α being calculated by formula (1) based on a hardness Hu of the rubber composition constituting the undertread layer and an elastic modulus Ec and a hardness Hc of a rubber composition constituting the cap tread layer, and
   a proportion G2/G1 being 0.55 or more and 0.80 or less, the proportion G2/G1 being a proportion of a thickness G2 of the undertread layer to a total thickness G1 of the cap tread layer and the undertread layer under a groove formed in an outer surface of the tread portion, $$\alpha = Hu/(Ec \times Hc) \times 1000 \qquad (1).$$

2. The pneumatic tire according to claim 1, wherein the diene rubber is composed of 80 mass % to 100 mass % of a natural rubber and 20 mass % to 0 mass % of a butadiene rubber.

3. The pneumatic tire according to claim 2, wherein the diene rubber is made of only a natural rubber.

* * * * *